United States Patent

[11] 3,581,187

| [72] | Inventor | Charles B. Grady, Jr. |
| | | West Orange, N.J. |
| [21] | Appl. No. | 835,717 |
| [22] | Filed | June 23, 1969 |
| [45] | Patented | May 25, 1971 |
| [73] | Assignee | The Metrodynamics Corporation |
| | | Carlstadt, N.J. |

[54] REGULATED DC POWER SUPPLY
8 Claims, 1 Drawing Fig.

[52] U.S. Cl. .................................................... 323/17,
307/310, 323/22T
[51] Int. Cl. ...................................................... G05f 1/58,
G05f 1/64
[50] Field of Search ........................................... 323/4.9,
16—22, 40; 317/29, 132; 330/143; 307/310

[56] References Cited
UNITED STATES PATENTS

| 3,241,042 | 3/1966 | Rosenfeld et al. ............ | 323/22(T) |
| 3,305,763 | 2/1967 | Kupferberg et al. ........... | 323/9 |
| 3,324,378 | 6/1967 | Kuperberg et al. ............ | 323/40 |
| 3,393,870 | 7/1968 | Jeffrey ......................... | 317/235(29) |
| 3,495,157 | 2/1970 | Nercessian ................... | 323/22(T) |
| 3,303,391 | 2/1967 | Kitami .......................... | 323/20 |

OTHER REFERENCES
Kepco Power Supply Handbook Pub. 1966 (2nd Print) Pages 31— 44 Relied upon Copy in Group 210

Primary Examiner—Gerald Goldberg
Attorney—Allison C. Collard

ABSTRACT: A regulated DC power supply wherein the main pass transistor is connected to an operational amplifier having a positive feedback which rapidly switches the main pass transistor on and off, rather than maintaining transistor continuously on, so as to intermittently supply DC power from a rectified source to the output of the supply while maintaining the voltage of the output within predetermined limits of voltage regulation for various loads and line current fluctuations. By rapidly switching the main pass transistor, it is possible to significantly reduce its heat dissipation and therefore reduce the size and cost of the power supply.

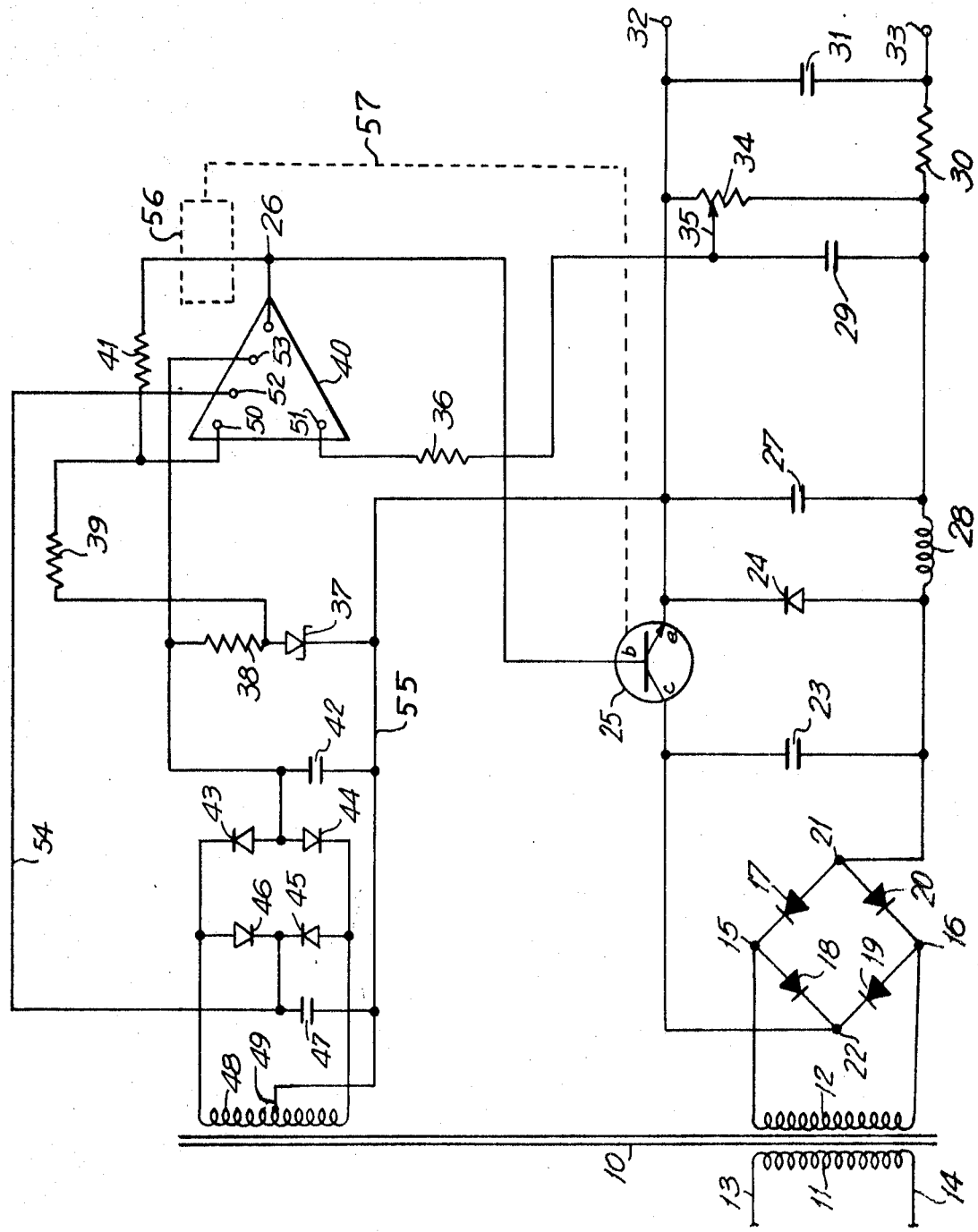

3,581,187

REGULATED DC POWER SUPPLY

This invention relates to an improved regulated DC power supply which is capable of operating with lower power dissipation than conventional regulated power supplies.

More specifically, this invention relates to an improved transistor regulated DC power supply wherein the main pass transistor is rapidly switched on and off so as to limit the power dissipation of the transistor during regulation.

In one type of conventional power supplies, the main pass transistor is generally connected to a voltage regulator source within the power supply so that the transistor is continuously operative in regulating the output of the supply to a fixed voltage for fluctuations in load and line current. The input of the main pass transistor is connected to a DC rectifier generally consisting of a plurality of diodes which deliver a DC output voltage to the transistor slightly higher than the voltage rating of the output of the supply. The main pass transistor is generally connected to a large heat sink which is capable of assisting the transistor in dissipating large amounts of power due to the voltage drop between the input and output of the pass transistor and the load current passing therethrough. The power capability of conventional power supplies is best limited to the maximum power dissipation which the transistor and suitable heat sink are capable of handling for any given situation. For small regulated power supplies capable of providing a few watts of DC power to the output, it is possible to utilize a single main pass transistor and heat sink combination without difficulty. However, for a large power requirement it is often necessary to utilize multiple transistors and large heat sinks in order to provide for the large power dissipation which takes place under full load conditions. This greatly increases not only the size of the power supply, but also its cost since additional components are required in order to handle the increased load.

In another type of conventional power supply, an error amplifier is utilized to sense the output voltage, and is connected to a voltage controlled multivibrator which is used to switch the main pass transistor on and off. This type of power supply is set at a constant switching frequency which is determined by the switching speed necessary to provide a minimum ripple voltage at the highest expected load current at the output of the supply. Therefore, for load currents which are less than the maximum, the switching speed is considerably higher than necessary. Since the major portion of power dissipation in the main pass transistor occurs during its transition from on to off state, there is a considerable reduction in operating efficiency and a greater than necessary power dissipation for smaller load currents.

Accordingly, in the present invention, the error amplifier and voltage controlled multivibrator are eliminated and substituted with an operational amplifier having a positive feedback. This amplifier senses the magnitude of the ripple voltage and controls the switching frequency of the main pass transistor, regardless of the load current. The operational amplifier also maintains a constant ripple magnitude regardless of the load current at the output of the supply.

If the transfer or switching time of the main pass transistor is reduced to approximately 3—4 microseconds, for an operating period of 50—100 microseconds, the magnitude of power dissipation in the main transistor can be greatly reduced so that a smaller than conventional main pass transistor and heat sink can be utilized to produce regulated DC power. Moreover, by reducing the heat dissipation of the supply, it is possible to greatly reduce its size and weight so that it may be contained in a smaller portion of an electronic subassembly.

It is therefore an object according to the present invention to provide a transistor regulated DC power supply which has minimum power dissipation and is reduced in size.

It is another object according to the present invention to provide a DC regulated power supply wherein the main pass transistor is rapidly switched on and off so as to reduce its power dissipation during full load conditions.

It is still a further object according to the present invention to provide transistor regulated DC power supply which is simple in design, inexpensive to manufacture, and reliable in operation.

Other objects and features of the present invention will become apparent from the following detailed description considered in connection with the accompanying drawing, which discloses one embodiment of the present invention. It is to be understood however that the drawing is designed for the purpose of illustration only and not as a definition of the limits of the invention.

The drawing shows a schematic representation of the transistor regulated DC power supply according to the invention.

Referring to the drawing, there is shown a transformer 10 having its primary winding 11 connected through terminals 13 and 14 to the AC line. One secondary winding 12, of transformer 10, is coupled to terminals 15 and 16 of a diode bridge rectifier having diodes 17, 18, 19 and 20 disposed within the bridge. The positive output 22 of the bridge rectifier is connected to the collector ($c$) of main pass transistor 25. The negative output 21 of the bridge rectifier is connected through inductor coil 28 and resistor 30 to output terminal 33 of the power supply. Connected across output terminals 21 and 22 of bridge rectifier is a filter capacitor 23.

Transformer 10 also includes an additional secondary winding 48 which, in conjunction with diodes 43, 44, 45 and 46, and filter capacitors 41 and 47, make up a plus and minus 12 volt local supply for the operational amplifier 40 which is connected to its terminals 52 and 53. Connected between the internal reference ground 55, and the minus 12 volt local supply is the series combination of resistor 38, and voltage reference or Zener diode 37. A resistor 39 is connected between diode 37 and resistor 38 to first input terminal 50 of amplifier 40. The output 26 of amplifier 40 also includes a positive feedback resistor 41 connected to its first input terminal 50. The value of resistor 41 is so chosen that the amplifier is basically unstable between clamp points. The second input terminal 51 of amplifier 40 is connected through resistor 36 to the moving terminal 35 of potentiometer 34. A capacitor 29 is also connected to terminal 35 to the output of inductor coil 28.

The emitter ($e$) of main pass transistor 25 is connected to the center tap 49 of secondary winding 48. A back biased commutating diode 24 is connected to the emitter terminal ($e$) of transistor 25 and the input terminal of coil 28. The base ($b$) of pass transistor 25 is connected to the output 26 of operational amplifier 40. Connected across output terminals 32 and 33 of the regulated supply is a further filter capacitor 31.

When the circuit according to the invention is made operational by connecting input terminals 13 and 14 of primary winding 11 to an AC supply, then, as the voltage on output terminals 32 and 33 increases in magnitude, a sample of this voltage from potentiometer 35 connected through resistor 36, to input 51 of amplifier 40, causes its output 26 to decrease in a negative direction as soon as the sample input on terminal 51 is sufficient to overcome the sum of the reference voltage and the positive feedback voltage component on input 50. With output 26 becoming more negative, the positive feedback loop 41 to input 50 causes the potential difference between inputs 50 and 51 to become even more negative to provide a regenerative effect, so that output 26 rapidly switches more negative in potential. This will trigger amplifier 40 to produce a signal on output 26, connected to the base ($b$) of pass transistor 25 to rapidly cutoff conduction of the transistor. When pass transistor 25 is turned off, so that it is nonconducting, the energy stored in inductor 28 is conducted through commutating diode 24, while capacitor 27 discharges across the output terminals of the supply so that the power is transferred to output terminals 32 and 33. The output voltage will then start to decrease as well as the sample voltage applied to input 51 of amplifier 40. When the magnitude of the sample voltage decreases so as to overcome the now negative influence of feedback loop 41, the output of the amplifier will increase in a positive direction and the feedback will thus reverse causing the pass transistor to switch to an on position, and therefore connect the rectified voltage source back to the output of the supply.

The switching time between full off, and full on condition for the pass transistor is approximately 3 to 4 microseconds for conduction and nonconduction periods of 50—100 microseconds. This fast switching transition time limits the power dissipation of main pass transistor 25 to a small magnitude. When the pass transistor is cut off, there is no power dissipation. Moreover, when the pass transistor is conductive, there is only a small power dissipation occuring. The greatest power dissipation, which occurs during the transfer between off and on conditions as described above, is produced only over a small portion of the operating period of the transistor.

Resistor 30 is a current limiting resistor having a very low resistance so as to limit the current provided by rectifiers 17—20 in the event that output terminals 32 and 33 are short-circuited.

The sliding arm 35 of reference potentiometer 34 may be adjusted so that the voltage appearing on output terminals 32 and 33 may be increased or decreased in order to set the predetermined voltage at the output of the supply.

In one embodiment of the invention constructed for providing 28 volts DC output for 0—3 amperes, the following component values were used:

| Component | Value |
| --- | --- |
| Diodes 17–20 and 43–46 | 1N4001. |
| Diode 24 | MR 831. |
| Reference diode 37 | IN823 (6.4 v.). |
| Transistor 25 | 2N5191. |
| Amplifier 40 | Integrated circuit Motorola MC1433 or equivalent. |
| Inductor coil 28 | 1 mh. |
| Capacitor 23 | 1,000 mfd. (60 v.) |
| Capacitor 27 | 1,000 mfd. (30 v.) |
| Capacitor 29 | .25 m'd. |
| Capacitor 42 | 200 m'd. |
| Capacitor 31 | 100 mfd. |
| Capacitor 47 | 200 mfd. |
| Variable resistor 34 | 200 ohms. |
| Resistor 30 | 1 ohm. |
| Resistor 38 | 2,000 ohms. |
| Resistor 36 | 430 ohms. |
| Resistor 41 | 1 megohm. |
| Resistor 39 | 1,000 ohms. |
| Transformer 10 (11–12–48) | 115-36-24 v. (CT.) 60 Hz. AC). |

The above construction, for a 28 volt DC output maintains a voltage regulation of ±2 mv. for a load current 0—3 amps and for AC line inputs between 100v.—130v.

For certain applications of the power supply, the small ripple voltage created by the switching of operational amplifier 40 may become objectionable. It is therefore possible in a further embodiment of the invention to disconnect feedback resistor 41 from the input of amplifier 40 so that the power supply circuit operates in a conventional manner. Amplifier 40 would then no longer operate in a switching mode but serve as a conventional amplifier to control main pass transistor 25, so that there would be negligible ripple voltage appearing on the output terminals of the power supply.

For higher power requirements where the dissipation of main pass transistor 25 would become excessive, a normally open circuited thermal relay 56 may be inserted in series connection with feedback resistor 41 as shown in dotted line. Thermal relay 56 is mechanically connected to the heat sink which supports main pass transistor 25, as shown by dotted line 57, so that when the temperature of the heat sink exceeds a predetermined high level, thermal relay 56 will close to reconnect feedback loop 41 back to input 50 of amplifier 40. This will convert amplifier 40 back into a switching amplifier and as previously described so as to limit the dissipation of transistor 25 for higher operating load conditions.

It is obvious that the above described regulated power supply according to the invention can be constructed for a variety of different output voltages and load requirements while maintaining excellent voltage regulation on its output, for fluctuations in load current and line voltages.

While only a few embodiments of the present invention have been shown and described, it will be understood that many changes and modifications may be made thereunto without departing from the spirit and scope of the invention.

What I claim is:

1. A switching-type regulated DC power supply energized from a rectified alternating current source for powering a load connected to the output comprising;

semiconductor switching means connected in series circuit between the rectified source and the output, an operational amplifier having a first and a second input and having its output connected to the control input of said semiconductor switching means, said amplifier having a positive feedback connection between its output and said first input, voltage reference means for producing a reference voltage and connected to said first input of said operational amplifier, said second input of said amplifier being coupled to sample the output supply voltage, an inductor coupled in series connection between the rectified source and the output of the supply, a commutating diode for coupling the output energy of said inductor into the output of said supply, and capacitor means coupled across said output terminals of said supply, said operational amplifier alternately turning on and off said semiconductor switching means in response to said sample output voltage relative to said voltage reference source.

2. The power supply as recited in claim 1, wherein said operational amplifier additionally comprises a further rectifier power source having its output coupled to said amplifier for providing DC power to said amplifier and said voltage reference means.

3. The power supply as recited in claim 1 wherein said semiconductor switching means comprises at least one switching transistor having its emitter and collector terminals in series connection between the rectified source and the supply output, and its base terminal connected to the output of said amplifier.

4. The power supply as recited in claim 3 wherein said voltage reference means comprises at least one Zener diode connected to said first input of said amplifier.

5. The power source as recited in claim 2 additionally comprising variable resistor means connected across the supply output and coupled to said second input of said amplifier.

6. The power source as recited in claim 5 additionally comprising at least one overload resistor in series connection with said supply output for limiting the output current of the supply.

7. The power source as recited in claim 4, additionally comprising normally open thermal switch means in series connection with said positive feedback connection, said switch means being thermally responsive to the temperature of said main pass transistor so as to connect same feedback connection to said operational amplifier when the temperature of said main pass transistor exceeds a predetermined level.

8. The power source as recited in claim 7 wherein said switch means comprises a thermal relay.

UNITED STATES PATENT OFFICE
CERTIFICATE OF CORRECTION

Patent No. 3,581,187　　　　　　　　Dated May 25, 1971

Inventor(s) Charles B. Grady, Jr.

It is certified that error appears in the above-identified patent and that said Letters Patent are hereby corrected as shown below:

Column 2, line 27, delete "41", and insert --42--.

Signed and sealed this 30th day of November 1971.

(SEAL)
Attest:

EDWARD M. FLETCHER, JR.　　　　　　ROBERT GOTTSCHALK
Attesting Officer　　　　　　　　　Acting Commissioner of Patents